(12) United States Patent
Chen

(10) Patent No.: US 10,451,919 B2
(45) Date of Patent: Oct. 22, 2019

(54) DISPLAY PANEL AND DISPLAY DEVICE

(71) Applicant: Shenzhen China Star Optoelectronics Technology Co., Ltd., Shenzhen, Guangdong (CN)

(72) Inventor: Lixuan Chen, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 30 days.

(21) Appl. No.: 15/750,180

(22) PCT Filed: Jan. 4, 2018

(86) PCT No.: PCT/CN2018/071458
§ 371 (c)(1),
(2) Date: Feb. 3, 2018

(87) PCT Pub. No.: WO2019/019560
PCT Pub. Date: Jan. 31, 2019

(65) Prior Publication Data
US 2019/0025643 A1    Jan. 24, 2019

(30) Foreign Application Priority Data
Jul. 24, 2017 (CN) .......................... 2017 1 0606503

(51) Int. Cl.
*G02F 1/1335* (2006.01)
*G02F 1/1362* (2006.01)

(52) U.S. Cl.
CPC .. *G02F 1/133602* (2013.01); *G02F 1/133509* (2013.01); *G02F 1/133514* (2013.01);
(Continued)

(58) Field of Classification Search
CPC ................................................. G02F 1/133607
See application file for complete search history.

(56) References Cited

U.S. PATENT DOCUMENTS

2012/0287381 A1* 11/2012 Li ..................... G02F 1/133617
349/106
2015/0070934 A1* 3/2015 Chou ................... G02B 6/0051
362/613
(Continued)

FOREIGN PATENT DOCUMENTS

CN    102109697 A    6/2011
CN    104076564 A    10/2014
(Continued)

*Primary Examiner* — Sang V Nguyen
(74) *Attorney, Agent, or Firm* — Andrew C. Cheng

(57) ABSTRACT

A display panel includes a backlight source, a color filter layer, and a blue filter film that are sequentially stacked. The color filter layer includes a blue pixel zone, which includes a first sub-pixel section and a second sub-pixel section. The blue filter film includes a first filtration section and a second filtration section, which are arranged opposite to the first sub-pixel section and the second sub-pixel section, respectively. The backlight source emits light that passes through the first sub-pixel section and the first filtration section to form first light, and the light emitting from the backlight source passes through the second sub-pixel section and the second filtration section to form second light. The first light has a luminous intensity that is different from a luminous intensity of the second light. A mobile terminal is also disclosed.

17 Claims, 4 Drawing Sheets

(52) U.S. Cl.
CPC .. *G02F 1/133617* (2013.01); *G02F 1/136286* (2013.01); *G02F 2001/133614* (2013.01)

(56) References Cited

U.S. PATENT DOCUMENTS

| | | | | |
|---|---|---|---|---|
| 2015/0116636 | A1* | 4/2015 | Chen | G02F 1/133514 |
| | | | | 349/86 |
| 2015/0228232 | A1* | 8/2015 | Lee | G09G 3/3607 |
| | | | | 345/88 |
| 2016/0146999 | A1* | 5/2016 | Yang | C09K 11/7492 |
| | | | | 362/606 |
| 2016/0370655 | A1* | 12/2016 | Nagayama | H01L 51/5281 |
| 2018/0088404 | A1* | 3/2018 | Chae | H01L 27/322 |
| 2018/0188593 | A1* | 7/2018 | Kim | G02F 1/133617 |
| 2018/0196313 | A1* | 7/2018 | Kang | G02B 5/20 |
| 2018/0203291 | A1* | 7/2018 | Jung | C08G 59/245 |
| 2018/0219051 | A1* | 8/2018 | Ghosh | H01L 27/3211 |

FOREIGN PATENT DOCUMENTS

| | | |
|---|---|---|
| CN | 104145210 A | 11/2014 |
| CN | 104297984 A | 1/2015 |
| CN | 104536198 A | 4/2015 |
| CN | 107219670 A | 9/2017 |

\* cited by examiner

DISPLAY PANEL AND DISPLAY DEVICE

CROSS REFERENCE TO RELATED APPLICATIONS

This application claims the priority of Chinese Patent Application No. 201710606503.7 filed on Jul. 24, 2017, titled "Display Panel and Display Device", the disclosure of which is incorporated herein by reference in its entirety.

BACKGROUND OF THE INVENTION

1. Field of the Invention

The present invention relates to the field of liquid crystal display technology, and more particularly to a display panel and a display device.

2. The Related Arts

Coloring of a liquid crystal display is realized with a color filter (CF). However, the known color filters suffer power light utilization and low transmittance, and in addition, a traditional color resist material has a relatively wide transmission peak and limited chrominance so that it is hard to realize wide gamut, making it not satisfying the requirements of users for image quality. Quantum dots (QDs) are hemispheric nanometer particulates made of elements of Groups II-VI or III-V, having a particle size that is around several nanometers and tens of nanometers. A quantum dot material has a relatively small width at half maximum for a light emission peak thereof and color of light emission may be easily adjusted by means of the size, structure, or composition of the quantum dot material so that the application thereof to a display device would help effectively improve color saturation and color gamut of the display device.

The quantum dot material absorbs blue light of short wave to be excited thereby to give off light color light in a long wave band. Such a characteristic allows blue light emitting from a blue backlight source to displays colors, such as red and green, after being projected to a quantum dot material. A quantum-dot color filter layer that is currently known is divided into a blue pixel zone, a red pixel zone, and a green pixel zone. Among these zones, the red pixel zone and the green pixel zone are filled with quantum dot materials, such that the quantum dot materials allow a user to perceive red light or green light at any angle, while the blue pixel zone is often filled with a transparent material or has no filling at all for the purpose of transmission of blue light therethrough. This often results in viewing angle related color shift problems in the blue pixel zone.

SUMMARY OF THE INVENTION

In view of the above problem, an object of this application is to provide a display panel and a display device that help alleviate the issue of viewing angle related color shifting in a blue pixel zone.

In order to overcome the deficiencies existing in the background art, in one aspect, this application provides a display panel, which comprises, stacked in sequence, a backlight source, a color filter layer, and a blue filter film, wherein the backlight source emits blue light; the color filter layer comprises a blue pixel zone, and the blue pixel zone allows the blue light to transmit therethrough, and the blue pixel zone comprises a first sub-pixel section and a second sub-pixel section; the blue filter film reduces intensity of the blue light and the blue filter film comprises a first filtration section and a second filtration section, the first filtration section being arranged opposite to the first sub-pixel section, the second filtration section being arranged opposite to the second sub-pixel section; the light emitting from the backlight source transmits through the first sub-pixel section and the first filtration section to form first light, and the light emitting from the backlight source transmits through the second sub-pixel section and the second filtration section to form second light, wherein the first light has a luminous intensity that is different from a luminous intensity of the second light.

In the above, the first filtration section has a thickness that is different from a thickness of the second filtration section.

In the above, a ratio between a surface area of the first sub-pixel section and a surface area of the second sub-pixel section is between 1:4 to 4:1.

In the above, the color filter layer further comprises a light-blocking zone, and the light-blocking zone is arranged between the first sub-pixel section and the second sub-pixel section.

In the above, the display panel further comprises a first data line and a second data line, the first sub-pixel section being electrically connected to the first data line, the second sub-pixel section being electrically connected to the second data line, the first data line and the second data line supplying data signals of different numbers.

In the above, the color filter layer further comprises a red pixel zone and a green pixel zone, the red pixel zone, the green pixel zone, and the blue pixel zone being mutually spaced from each other, the red pixel zone being excited by the blue light to give off red light, the green pixel zone being excited by the blue light to give off green light, spacing gaps among the red pixel zone, the green pixel zone, and the blue pixel zone being provided with a light-blocking zone for blocking light.

In the above, the blue filter film further comprises a third filtration section, and the third filtration section is opposite to the red pixel zone and the green pixel zone.

In the above, the third filtration section has a thickness that is different from a thickness of the first filtration section and a thickness of the second filtration section.

In the above, the red pixel zone comprises a first quantum dot material, and the first quantum dot material is excited by the blue light to emit the red light the green pixel zone comprises a second quantum dot material, and the second quantum dot material is excited by the blue light to emit the green light and the first sub-pixel section and the second sub-pixel section comprise a light transmitting material, and the light transmitting material allows the blue light to pass therethrough.

On the other hand, this application also provides a display device, which comprises a display panel, the display panel comprising, stacked in sequence, a backlight source, a color filter layer, and a blue filter film, wherein the backlight source emits blue light; the color filter layer comprises a blue pixel zone, and the blue pixel zone allows the blue light to transmit therethrough, and the blue pixel zone comprises a first sub-pixel section and a second sub-pixel section; the blue filter film reduces intensity of the blue light and the blue filter film comprises a first filtration section and a second filtration section, the first filtration section being arranged opposite to the first sub-pixel section, the second filtration section being arranged opposite to the second sub-pixel section; the light emitting from the backlight source transmits through the first sub-pixel section and the first filtration section to form first light, and the light emitting from the backlight source transmits through the second sub-pixel section and the second filtration section to form second light, wherein the first light has a luminous intensity that is different from a luminous intensity of the second light.

Compared to the prior art, this application provides a display panel, which possesses at least the following advantages:

This application provides a display panel, which comprises a backlight source, a color filter layer, and a blue filter film. A blue pixel zone of the color filter layer is divided into a first sub-pixel section and a second sub-pixel section, such that a first filtration section of the blue filter film is opposite to the first sub-pixel section and a second filtration section of the blue filter film is opposite to the second sub-pixel section. Light emitting from the backlight source passes, in sequence, through the color filter layer and the blue filter film. Since the blue pixel zone is divided into two or more than two sub-pixel sections and the blue filter film is divided into two or more than two filtration sections and the filtration sections of the blue filter film respectively correspond to the sub-pixel sections, through connection of the sub-pixel sections with data signals of different numbers or through adjustment of a ratio of surface areas among the sub-pixel sections or a ratio of thicknesses among the filtration sections, it is possible to have the luminous intensity of the light passing through the first sub-pixel section and the luminous intensity of the light passing through the second sub-pixel section different from each other. This would make each of the sub-pixel sections of the blue pixel zone to generate mutually different levels of display brightness and oblique viewing brightness to thereby alleviate the issue of viewing angle related color shifting associate with blue light of the blue pixel zone. Further, the blue filter film helps reduce the intensity of the blue pixel zone so as to alleviate potential risk of damaging the eyes of the users by the blue light.

BRIEF DESCRIPTION OF THE DRAWINGS

To more clearly explain the technical solution proposed in embodiments of this application, a brief description of the drawings that are necessary for describing the embodiments will be given below. It is obvious that the drawings that will be described below show only some embodiments of this application. For those having ordinary skills of the art, other drawings may be readily available from these attached drawings without the expense of creative effort and endeavor.

DETAILED DESCRIPTION OF THE PREFERRED EMBODIMENTS

A clear and complete description will be given to technical solutions provided in the embodiments of this application with reference to the attached drawings of the embodiments of this application.

Figure 1:
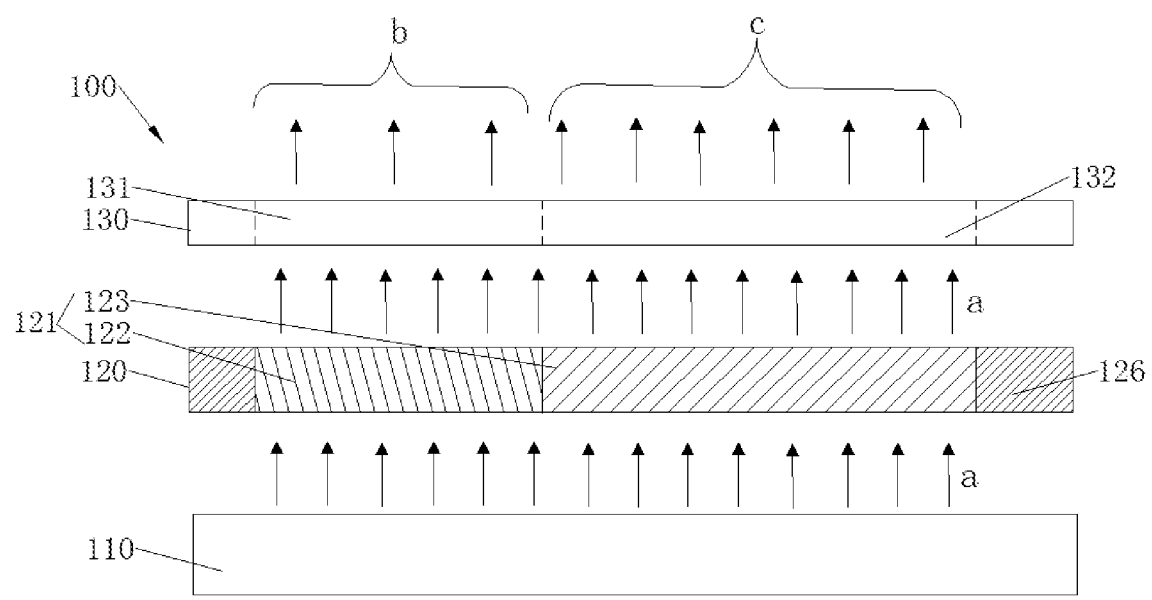
FIG. 1 is a schematic view illustrating a part cross-sectional structure of a display panel provided in embodiments of this application.

Referring to FIG. 1, FIG. 1 is a schematic view illustrating a part cross-sectional structure of a display panel 100 provided in embodiments of this application provides. The embodiments of this application provide a display panel 100. The display panel 100 comprises a backlight source 110, a color filter layer 120, and a blue filter film 130. The backlight source 110 emits blue light a. The color filter layer 120 comprises a blue pixel zone 121. The blue pixel zone 121 allows the blue light a to transmit therethrough. The blue pixel zone 121 comprises a first sub-pixel section 122 and a second sub-pixel section 123. The blue filter film 130 functions to reduce the intensity of the blue light a. The blue filter film 130 comprises a first filtration section 131 and a second filtration section 132. The first filtration section 131 is arranged opposite to the first sub-pixel section 122 and the second filtration section 132 is arranged opposite to the second sub-pixel section 123. The light a emitting from the backlight source 110 transmits through the first sub-pixel section 122 and the first filtration section 131 to form first light b, and the light a emitting from the backlight source 110 transmits through the second sub-pixel section 123 and the second filtration section 132 to form second light c. The first light b has a luminous intensity that is different from a luminous intensity of the second light c. In other words, the first sub-pixel section 122 has display brightness that is different from display brightness of the second sub-pixel section 123.

Optionally, the blue pixel zone 121 can be alternatively divided into three or more than three sub-pixel sections, and correspondingly thereto, the blue filter film 130 is divided into three or more than three filtration sections. The sub-pixel sections are arranged respectively opposite to different ones of the filtration sections to regulate the display brightness of the blue pixel zone 121 and improve deficiency of visual color shifting associated with the blue pixel zone 121.

Figure 2:
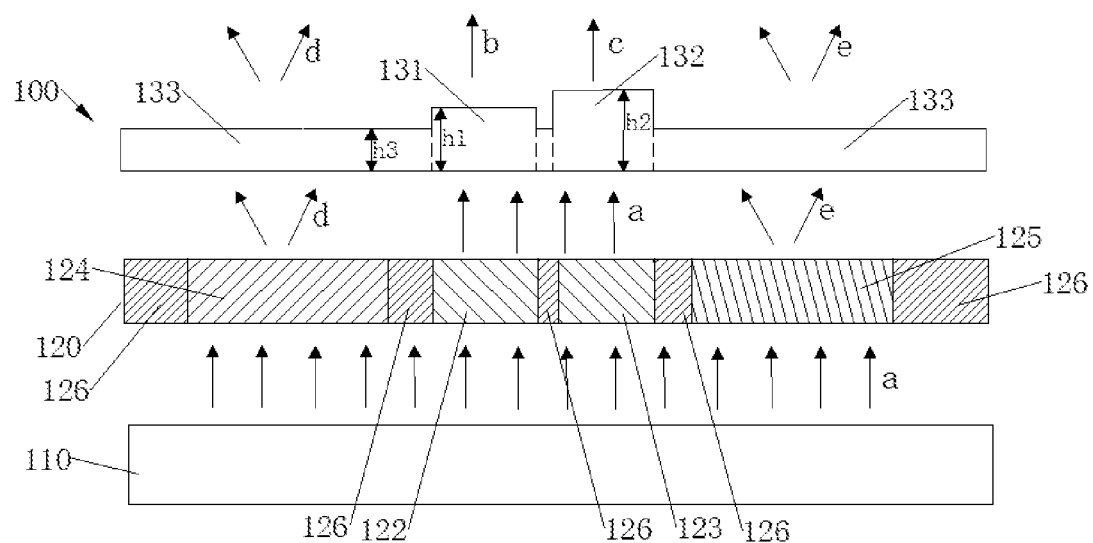
FIG. 2 is a schematic view illustrating a part cross-sectional structure of a display panel provided in the embodiments of this application.

Referring to FIG. 2, FIG. 2 is a schematic view illustrating a part cross-sectional structure of a display panel 100 provided in the embodiments of this application. The color filter layer 120 further comprises a green pixel zone 124 and a red pixel zone 125. The red pixel zone 125, the green pixel zone 124, and the blue pixel zone 121 are arranged in a manner of being spaced from each other. The red pixel zone 125 emits red light e under excitation of the blue light a. The green pixel zone 124 emits green light d under the excitation of the blue light a. Spacing gaps among the red pixel zone 125, the green pixel zone 124, and the blue pixel zone 121 are provided with a light-blocking zone 126. The light-blocking zone 126 can be metal chromium, acrylic resin, or a black resin, for blocking light and is also referred to as a black matrix. It can be appreciated that the color filter layer is generally formed of multiple green pixel zones 124, red pixel zones 125, and blue pixel zones 121 arranged alternate with each other to form an array in order to display colors.

Further, referring to FIG. 2, the green pixel zone 124 is filled with a first quantum dot material, and the red pixel zone 125 is filled with a second quantum dot material. The backlight source 110 emits the blue light a to irradiate the green pixel zone 124, the red pixel zone 125, and the blue pixel zone 121 such that the first quantum dot material is excited by the blue light a to emit the green light d from the green pixel zone 124 and the second quantum dot material is excited by the blue light a to emit the red light e from the red pixel zone 125. Since quantum dot materials are electroluminescent, it is possible to improve a viewing angle of light projection so that the green pixel zone 124 and the red pixel zone 125 do not suffer viewing angle related color shifting issues.

Further, referring to FIG. 2, to allow the blue light a to project out of the blue pixel zone 121, the first sub-pixel section 122 and the second sub-pixel section 123 may be disposed with a light transmitting material, and the light transmitting material allows for transmission of the blue light a. Alternatively, the first sub-pixel section 122 and the second sub-pixel section 123 are provided with no substance. When the blue light a emitting from the backlight source 110 passes through the blue pixel zone 121, since the blue pixel zone 121 includes no quantum dot material, if a light exit angle and the blue light intensity of the blue light a projecting out of the blue pixel zone 121 are not variable, then viewing angle related color shifting may occur in the blue pixel zone 121 of the display panel 100 and the intensity of the exit blue light is also high, this being susceptible to cause damage to the eyes of users.

In the instant embodiment, the blue pixel zone 121 of the color filter layer 120 is divided into the first sub-pixel section 122 and the second sub-pixel section 123, such that the first filtration section 131 of the blue filter film 130 is opposite to the first sub-pixel section 122 and the second filtration section 132 of the blue filter film 130 is opposite to the second sub-pixel section 123. Light emitting from the backlight source 110 passes, in sequence, through the color filter layer 120 and the blue filter film 130. Since the blue pixel zone 121 is divided into two or more than two sub-pixel sections and the blue filter film 130 is divided into two or more than two filtration sections and the filtration sections of the blue filter film 130 respectively correspond to the sub-pixel sections, through connection of the sub-pixel sections with data signals of different numbers or through adjustment of a ratio of surface areas among the sub-pixel sections or a ratio of thicknesses among the filtration sections, it is possible to have the luminous intensity of the light passing through the first sub-pixel section 122 and the luminous intensity of the light passing through the second sub-pixel section 123 different from each other. This would make each of the sub-pixel sections of the blue pixel zone 121 to generate mutually different levels of display brightness and oblique viewing brightness to thereby alleviate the issue of viewing angle related color shifting associate with blue light of the blue pixel zone 121. Further, the blue filter film 130 helps reduce the intensity of the blue pixel zone 121 so as to alleviate potential risk of damaging the eyes of the users by the blue light.

In this application, to alleviate the issue of viewing angle related color shifting associated with blue light of the blue pixel zone 121, the blue pixel zone 121 is divided into the first sub-pixel section 122 and the second sub-pixel section 123 and certain measures are taken to adjust the levels of display brightness of the first sub-pixel section 122 and the second sub-pixel section 123, such as having the two sub-pixel sections connected to data signals of different numbers or adjusting a surface area ratio between the two sub-pixel sections or a thickness ratio between the two filtration sections. Specific description will be given to example embodiments provided below; however, this application, although comprising, is not limited to the example embodiment provided below. In this application, the level of display brightness of the first sub-pixel section 122 refers to the level of brightness displayed by the first sub-pixel section 122 on the display panel 100 at a location corresponding thereto and the level of display brightness of the second sub-pixel section 123 refers to the level of brightness displayed by the second sub-pixel section on the display panel 100 at a location corresponding thereto.

First Example Embodiment

Referring to FIG. 2, the blue filter film 130 functions to reduce the intensity of exit blue light so that the transmission of the blue light becomes difficult below a certain level of brightness and, for brightness above the certain level, the blue light, in transmitting therethrough, would be subjected to reduction of the brightness thereof. By making a thickness h1 of the first filtration section 131 and a thickness h2 of the second filtration section 132 different from each other, the instant embodiment makes reduction of the blue light brightness of the first filtration section 131 and the reduction of the blue light brightness of the second filtration section 132 different from each other so that the display brightness displayed with the first sub-pixel section 122 and the display brightness displayed with the second sub-pixel section 123 are different and thus the issue of viewing angle related color shifting of blue light of the blue pixel zone 121 can be alleviated.

Optionally, the first filtration section 131 and the second filtration section 132 can be made of materials that are identical and the blue filter film 130 is formed through patterning. This would reduce the difficulty of operation and save labor and material.

The material of the blue filter film 130 is not subjected to any constraint in this application.

Figure 3:
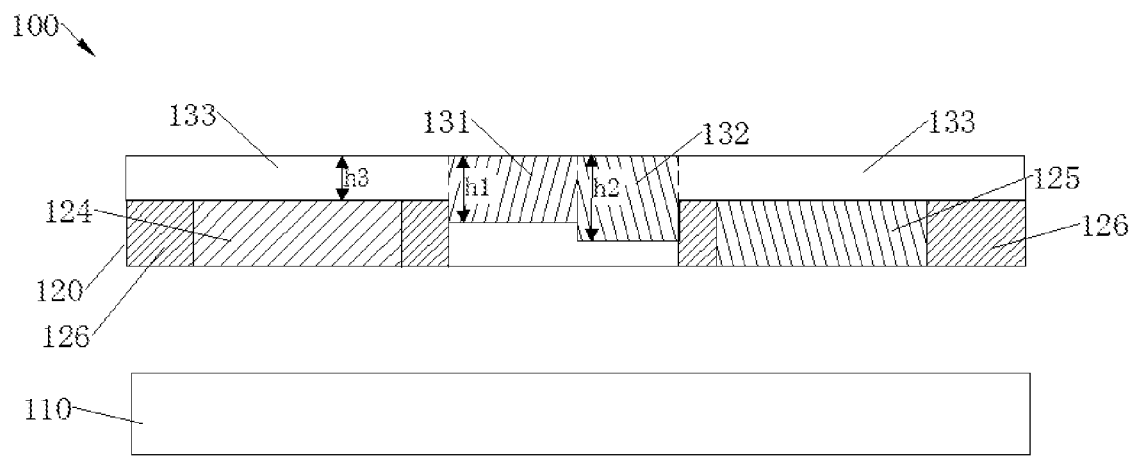
FIG. 3 is a schematic view illustrating a part cross-sectional structure of a display panel provided in the embodiments of this application.

Referring to FIG. 3, the first sub-pixel section 122 and the second sub-pixel section 123 are provided with no substance therein. This would allow the first filtration section 131 and the second filtration section 132 to be respectively inserted into the first sub-pixel section 122 and the second sub-pixel section 123 so as to reduce an overall thickness of the display panel 100, enhancing development of the display panel 100 toward thinned configurations.

Second Example Embodiment

In the instant embodiment, adjustment is made on a ratio between a surface area of the first sub-pixel section 122 and a surface area of the second sub-pixel section 123 so as to make the display brightness displayed by the first sub-pixel section 122 and the display brightness displayed by the second sub-pixel section 123 different from each other so as to alleviate the issue of viewing angle related color shifting of blue light of the blue pixel zone 121.

Optionally, the ratio between the surface area of the first sub-pixel section 122 and the surface area of the second sub-pixel section 123 is between 1:4 and 4:1. For the case that the surface area of one of the sub-pixel sections of the blue pixel zone 121 is excessively large, then the brightness of the blue light passing through the sub-pixel section would be high and the effect of reducing blue light becomes weak. For the case that the surface area of one of the sub-pixel sections of the blue pixel zone 121 is excessively small, then the brightness of the blue light passing through the sub-pixel section would be high and displaying quality of the display panel 100 would be affected.

Optionally, referring to FIG. 2, the light-blocking zone 126 is arranged between the first sub-pixel section 122 and the second sub-pixel section 123 to separate the first sub-pixel section 122 and the second sub-pixel section 123 from each other. Further, the light-blocking zone 126 may block the blue light, so as to reduce the intensity of the blue light.

Third Example Embodiment

The display panel 100 further comprises a first data line and a second data line (not shown). The first sub-pixel section 122 is electrically connected to the first data line and the second sub-pixel section 123 is electrically connected to the second data line. The first data line and the second data line supply data signals of different number. Thus, the first sub-pixel section 122 and the second sub-pixel section 123 are supplied with data signals of different numbers so that the first sub-pixel section 122 and the second sub-pixel section 123 demonstrate different gray levels to thereby make the display brightness displayed by the first sub-pixel section 122 and the display brightness displayed by the second sub-pixel section 123 different from each other and thus alleviating the issue of viewing angle related color shifting of blue light of the blue pixel zone 121.

In this application, the technical solutions provided in the first, second, and third example embodiments described above can be used in combination with each other, namely the thicknesses of the first filtration section 131 and the second filtration section 132 can be adjusted according to a ratio of the surface areas of the first sub-pixel section 122 and the second sub-pixel section 123, or the input signals supplied to the first sub-pixel section 122 and the second sub-pixel section 123 can be adjusted according to the thicknesses of the first filtration section 131 and the second filtration section 132, or the input signals supplied to the first sub-pixel section 122 and the second sub-pixel section 123 can be adjusted according to a ratio of the surface areas of the first sub-pixel section 122 and the second sub-pixel section 123, such that normal viewing and oblique viewing would have optimum performance of blue light brightness.

Optionally, referring to FIGS. 2 and 3, the blue filter film 130 further comprises a third filtration section 133, and the third filtration section 133 is opposite to the red pixel zone 125 and the green pixel zone 124.

Optionally, the third filtration section 133 has a thickness h3 that is different from a thickness h1 of the first filtration section 131 and a thickness h2 of the second filtration section 132 for transmission of blue light at different levels of brightness.

In this application, the color filter layer 120 has a light emission layer that is formed of a quantum dot material, meaning the color filter layer 120 is a quantum-dot color filter layer 120, in which a first quantum dot material and a second quantum dot material are each selected from quantum dot materials of Group II-VI or Group III-V, and are preferably each selected as one or a combination of multiple ones of materials including CdS, CdSe, CdTe, and ZnS. These semiconductor quantum dots all follow the quantum dot size effect and have energy levels that vary with variation of the quantum dot size and properties that also vary with variation of the quantum dot size, such as absorption and emission of luminous intensity being variable with size variation, so that it is possible to control the emissive luminous intensity by changing the size thereof. Through controlling the size of the quantum dot, it is possible to emit, through excitation, monochromic red light having a luminous intensity of 630-720 nm and monochromic green light having a luminous intensity of 500-560 nm.

The color filter layer 120 fabricated with the above-described way of manufacturing of the color filter layer 120 can be used in combination with blue backlight so that the red pixel zone 125 and the green pixel zone 124 of the color filter layer 120 are respectively formed with red and green patterns, which, upon excitation by the blue light, would make the red and green patterns emitting red light and green light, respectively, and the blue light emitting from the backlight source 110 is allowed to transmit through the blue pixel zone 121 to display a blue color, thereby realizing displaying of three primary colors of red, green, and blue.

Figure 4:
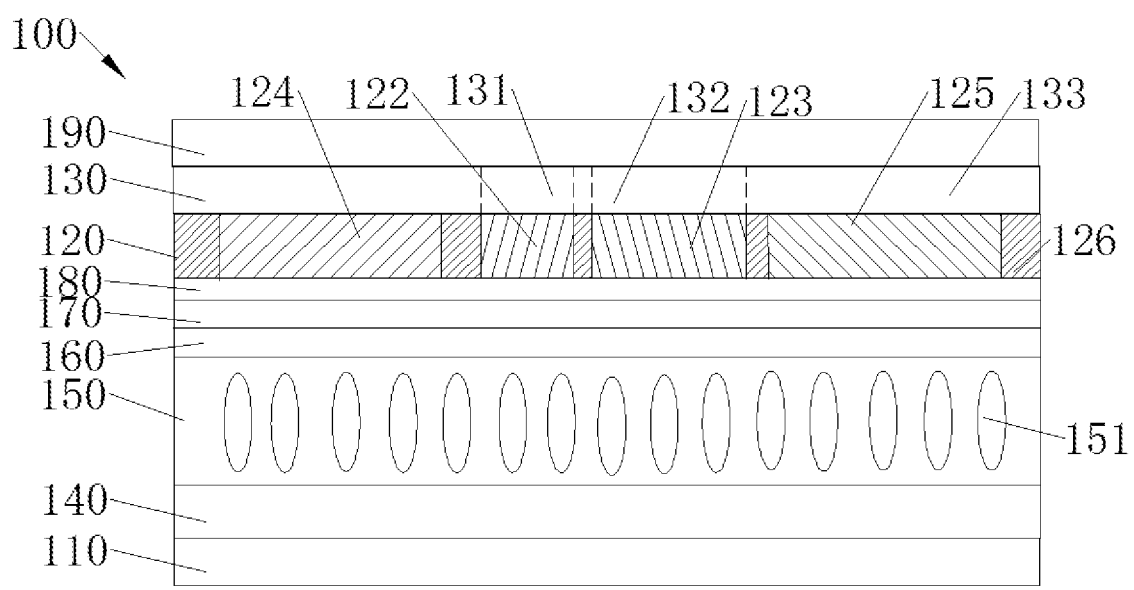
FIG. 4 is a schematic view illustrating a part cross-sectional structure of a display panel provided in the embodiments of this application.

Optionally, referring to FIG. 4, the color filter layer 120 and the backlight source 110 may further comprises, arranged therebetween, a thin-film transistor layer 140, a liquid crystal layer 150, a transparent conductive film layer 160, a polarization layer 170, and a planarization layer 180 stacked in sequence. The thin-film transistor layer 140 is arranged on the side that is close to the backlight source 110. The liquid crystal layer 150 contains liquid crystal molecules 151. The display panel 100 further comprises a base plate 190, and the base plate 190 is provided on one side of the blue filter film 130 that is distant from the color filter layer 120.

In the instant embodiment, the polarization layer 170 is arranged between the liquid crystal layer 150 and the color filter layer 120. This is because the mechanism that the quantum dot material generates color is electroluminescence ad this causes influence on the transmission of polarized light of the display panel 100. By arranging the polarization layer 170 on one side of the color filter layer 120 at a location between the color filter layer 120 and the liquid crystal layer 150, it is possible to prevent the result of displaying from being affected by the polarized light being converted into partly polarized light after passing through the color filter layer 120.

The transparent conductive film layer 160 is formed of a material comprising metal oxides, such as indium tin oxides, indium zinc oxides, aluminum tin oxides, aluminum zinc oxides, indium germanium zinc oxides, other suitable oxides, or a stacked layer of at least two of the above.

Optionally, the planarization layer 180 covers the color filter layer 120. Since the quantum dot material is sensitive to moisture and oxygen, it is necessary to place the planarization layer 180 between the polarization layer 170 and the color filter layer 120 to encapsulate the quantum dot material for protection of the quantum dot material against oxidization.

In the above, the planarization layer 180 is formed of a material comprising an inorganic material (such as silicon oxide, silicon nitride, silicon oxynitride, other suitable materials, or a stacked layer of at least two of the above), an organic material (such as polyester (PET), polyolefin, polyacrylamide, polycarbonate, polysiloxane, polystyrene, polyether, polyketide, polyol, polyaldehyde, or other suitable materials, or a combination thereof), or other suitable materials, or a combination thereof.

The embodiments of this application also provide a display device, which comprises a display panel 100 according to any one of the above embodiments. The display device could be any electronic equipment that includes the display panel 100, such as a liquid crystal television, a mobile phone, a personal digital assistant (PDA), a digital camera, a computer display, or a notebook computer screen.

This application provides a display device, which allows sub-pixel sections of a blue pixel zone 121 to generate different levels of display brightness and oblique viewing brightness so as to alleviate the issue of viewing angle related color shifting associated with blue light of the blue pixel zone 121 and enhance displaying quality of the display device. The blue filter film 130 may reduce the intensity of the blue pixel zone 121 so as to reduce damage of eyes of users caused by blue light.

In summary, although the above disclosure provides the preferred embodiments of this application, the preferred embodiments are not intended to limit this application. For those having ordinary skills in the art, various changes and modifications are available without departing from the sprit and scope of this application. Thus, the scope of protection of this application is only determined by the appended claims.

What is claimed is:

1. A display panel, comprising, stacked in sequence, a backlight source, a color filter layer, and a blue filter film, wherein the backlight source emits blue light; the color filter layer comprises a blue pixel zone, and the blue pixel zone allows the blue light to transmit therethrough, and the blue pixel zone comprises a first sub-pixel section and a second sub-pixel section arranged side by side; the blue filter film reduces intensity of the blue light and the blue filter film comprises a first filtration section and a second filtration section, the first filtration section being arranged opposite to the first sub-pixel section, the second filtration section being arranged opposite to the second sub-pixel section; the light emitting from the backlight source transmits through the first sub-pixel section and the first filtration section to form first light, and the light emitting from the backlight source transmits through the second sub-pixel section and the second filtration section to form second light, wherein the first light has a luminous intensity that is different from a luminous intensity of the second light;

wherein the blue light emitting from the backlight source is allowed to transmit through the blue pixel zone to emit as secondary blue light that comprises first blue light transmitting through the first sub-pixel section of the blue pixel zone and second blue light transmitting through the second sub-pixel section of the blue pixel zone; and wherein the first blue light transmitting through the first sub-pixel section and the second blue light transmitting through the second sub-pixel section respectively transmit through the first filtration section and the second filtration section of the blue filter film to form the first light and the second light that are each blue light having a different luminous intensity.

2. The display panel according to claim 1, wherein the first filtration section has a thickness that is different from a thickness of the second filtration section.

3. The display panel according to claim 1, wherein a ratio between a surface area of the first sub-pixel section and a surface area of the second sub-pixel section is between 1:4 to 4:1.

4. The display panel according to claim 1, wherein the color filter layer further comprises a light-blocking zone, and the light-blocking zone is arranged between the first sub-pixel section and the second sub-pixel section.

5. The display panel according to claim 1, wherein the display panel further comprises a first data line and a second data line, the first sub-pixel section being electrically connected to the first data line, the second sub-pixel section being electrically connected to the second data line, the first data line and the second data line supplying data signals of different numbers.

6. The display panel according to claim 1, wherein the color filter layer further comprises a red pixel zone and a green pixel zone, the red pixel zone, the green pixel zone, and the blue pixel zone being mutually spaced from each other, the red pixel zone being excited by the blue light to give off red light, the green pixel zone being excited by the blue light to give off green light, spacing gaps among the red pixel zone, the green pixel zone, and the blue pixel zone being provided with a light-blocking zone for blocking light.

7. The display panel according to claim 6, wherein the blue filter film further comprises a third filtration section, and the third filtration section is opposite to the red pixel zone and the green pixel zone.

8. The display panel according to claim 7, wherein the third filtration section has a thickness that is different from a thickness of the first filtration section and a thickness of the second filtration section.

9. The display panel according to claim 8, wherein the red pixel zone comprises a first quantum dot material, and the first quantum dot material is excited by the blue light to emit the red light; the green pixel zone comprises a second quantum dot material, and the second quantum dot material is excited by the blue light to emit the green light; and the first sub-pixel section and the second sub-pixel section comprise a light transmitting material, and the light transmitting material allows the blue light to pass therethrough.

10. A display device, comprising a display panel, the display panel comprising, stacked in sequence, a backlight source, a color filter layer, and a blue filter film, wherein the backlight source emits blue light; the color filter layer comprises a blue pixel zone, and the blue pixel zone allows the blue light to transmit therethrough, and the blue pixel zone comprises a first sub-pixel section and a second sub-pixel section arranged side by side; the blue filter film reduces intensity of the blue light and the blue filter film comprises a first filtration section and a second filtration section, the first filtration section being arranged opposite to the first sub-pixel section, the second filtration section being arranged opposite to the second sub-pixel section; the light emitting from the backlight source transmits through the first sub-pixel section and the first filtration section to form first light, and the light emitting from the backlight source transmits through the second sub-pixel section and the second filtration section to form second light, wherein the first light has a luminous intensity that is different from a luminous intensity of the second light;

wherein the blue light emitting from the backlight source is allowed to transmit through the blue pixel zone to emit as secondary blue light that comprises first blue light transmitting through the first sub-pixel section of the blue pixel zone and second blue light transmitting through the second sub-pixel section of the blue pixel zone; and wherein the first blue light transmitting through the first sub-pixel section and the second blue light transmitting through the second sub-pixel section respectively transmit through the first filtration section and the second filtration section of the blue filter film to form the first light and the second light that are each blue light having a different luminous intensity.

11. The display device according to claim 10, wherein the first filtration section has a thickness that is different from a thickness of the second filtration section.

12. The display device according to claim 10, wherein a ratio between a surface area of the first sub-pixel section and a surface area of the second sub-pixel section is between 1:4 to 4:1.

13. The display device according to claim 10, wherein the color filter layer further comprises a light-blocking zone, and the light-blocking zone is arranged between the first sub-pixel section and the second sub-pixel section.

14. The display device according to claim 10, wherein the display panel further comprises a first data line and a second data line, the first sub-pixel section being electrically connected to the first data line, the second sub-pixel section being electrically connected to the second data line, the first data line and the second data line supplying data signals of different numbers.

15. The display device according to claim 10, wherein the color filter layer further comprises a red pixel zone and a green pixel zone, the red pixel zone, the green pixel zone, and the blue pixel zone being mutually spaced from each other, the red pixel zone being excited by the blue light to give off red light, the green pixel zone being excited by the blue light to give off green light, spacing gaps among the red pixel zone, the green pixel zone, and the blue pixel zone being provided with a light-blocking zone for blocking light.

16. The display device according to claim 15, wherein the blue filter film further comprises a third filtration section, and the third filtration section is opposite to the red pixel zone and the green pixel zone.

17. The display device according to claim 16, wherein the third filtration section has a thickness that is different from a thickness of the first filtration section and a thickness of the second filtration section.

\* \* \* \* \*